United States Patent

Majima et al.

Patent Number: 5,314,592
Date of Patent: May 24, 1994

[54] METHOD FOR ENRICHMENT OF OXYGEN 18 WITH A LASER

[75] Inventors: Tetsuro Majima; Kyoko Sugita, both of Wako; Shigeyoshi Arai, Kyoto, all of Japan

[73] Assignee: Rikagaku Kenkyusho, Wako, Japan

[21] Appl. No.: 828,966

[22] PCT Filed: Aug. 29, 1990

[86] PCT No.: PCT/JP90/01093
§ 371 Date: Feb. 13, 1992
§ 102(e) Date: Feb. 13, 1992

[87] PCT Pub. No.: WO91/03308
PCT Pub. Date: Mar. 21, 1991

[30] Foreign Application Priority Data

Aug. 30, 1989 [JP] Japan ................. 1-223887
Jun. 25, 1990 [JP] Japan ................. 2-166254

[51] Int. Cl.$^5$ ............................................. B01D 5/00
[52] U.S. Cl. .................................... 204/157.2; 423/2
[58] Field of Search ............. 204/157.2; 423/579, 423/2

[56] References Cited

U.S. PATENT DOCUMENTS

| | | | |
|---|---|---|---|
| 3,947,335 | 3/1976 | Marling | 204/157.2 |
| 4,029,558 | 6/1977 | Marling | 204/157.2 |
| 4,212,717 | 7/1980 | Moore et al. | 204/157.22 |
| 4,374,010 | 2/1983 | Vikis | 204/157.21 |
| 4,437,958 | 3/1984 | Rockwood e al. | 204/157.22 |
| 4,801,365 | 1/1989 | Rich et al. | 204/157.22 |

OTHER PUBLICATIONS

Nihon Kagakukai Journal No. 10, Oct., 1984, (Tokyo), (Author: Tetsu Majima and two others) "Dissociation reaction of multiple infrared photon in perfluorodimethyl ether", pp. 1490–1497.

Chemical Abstracts, vol. 111, No. 16, p. 559, Oct. 9, 1989, No. 142702q, V. B. Laptev, et al, "Laser Separation of Oxygen Isotopes By IR Multiphoton Dissociation of Dimethyl Ether".

Chemical Abstracts, vol. 102, No. 20, p. 628, May 13, 1985, No. 176310q, T. Majima, et al., "Oxygen-18 Separation in Infrared Multiple-Photon Decomposition of Perfluorodimethyl Ether".

*Primary Examiner*—Donald P. Walsh
*Assistant Examiner*—Ngoclan T. Mai
*Attorney, Agent, or Firm*—Oblon, Spivak, McClelland, Maier & Neustadt

[57] ABSTRACT

The present invention relates to a method for enrichment of oxygen 18, which comprises the steps of optionally adding a hydrocarbon to a saturated aliphatic ether other than dimethyl ether and/or a saturated cyclic ether as an oxygen 18-containing starting material, irradiating the material(s) with laser light to induce oxygen 18 selective photodecomposition and separating oxygen 18-containing products from the photodecomposed products. Oxygen 18 enriched compounds obtained by the present invention can be used as tracers and the like.

12 Claims, 1 Drawing Sheet

METHOD FOR ENRICHMENT OF OXYGEN 18 WITH A LASER

FIELD OF THE INVENTION

The present invention relates to a method for separation and enrichment of oxygen 18 with a laser, and more particularly to a method for enrichment of oxygen 18 utilizing infrared multiple-photon decomposition of a saturated aliphatic ether other than dimethyl ether or a saturated cyclic ether with a TEA—$CO_2$ laser.

DESCRIPTION OF THE PRIOR ART

There exist naturally three isotopes of oxygen, oxygen 16, oxygen 17 and oxygen 18, which account for 99.8%, 0.037% and 0.204% of the Earth's oxygen, respectively. Enriched oxygen 18 isotope is widely used as a tracer and is in strong demand. Therefore, an economical method of enrichment of oxygen 18 capable of supplying large amounts of oxygen 18 would profit a society and promote scientific progress.

Methods for enrichment of oxygen 18 able to produce more than 1 g/day that have been studied up to now include the distillation method, the electrolytic method and the chemical exchange method. Actual enrichment of oxygen 18 is currently being conducted using the NO low temperature distillation method at a production rate of 3 kg/year of oxygen 18 having at least 90% purity. However, the enrichment factor ($\alpha_{18}$) of $^{18}O$ (1.037) is low, the operatrion temperature is low ($-151.8°$ C.), and too large plant systems (a low enrichment distillation column (42 m) and a high distillation column (90 m)) are required. The inventors therefore studied the laser isotope enrichment method for its potential to enable reduction of plant size, highly selective single-step enrichment, and shortening of the processing time.

When a gaseous substance is irradiated with strong pulsed infrared laser light, it dissociates after absorption of several tens of infrared photons per single molecule. This is known as infrared multiple-photon decomposition. By properly selecting the starting materials and irradiation conditions, it is possible to dissociate isotopes with high selectivity. Thus, the infrared multiple-photon decomposition can be applied for enrichment and separation of isotopes.

Laser isotope separation and enrichment with a TEA—$CO_2$ laser, which posesses relatively high laser power and is one of the easiest to operate among commercially available pulsed infrared lasers, has been studied in detail.

Chemical compounds already studied for enrichment of oxygen 18 utilizing oxygen 18 selective infrared multiple-photon decomposition with a TEA—$CO_2$ laser include dimethyl ether ① [V. V. Vizhn, Y. N. Molin, A. K. Petrov, and A. R. Sorokin, Appl. Phys., 17, 385 (1978)], ② ]K. O. Kutschke, C. Willis, P. A. Hackett, J. Photochem., 21, 207 (1983)], ③ [Tetsuro. Majima, Takashi. Igarashi, and Shigeyoshi. Arai, Nippon Kagaku kaishi, 1490 (1984) ], perfluoroacetone [P. A. Hackett, C. Willis, and M. Gauthier, J. Chem. Phys., 71, 2682 (1982)], and $UO_2$ (hexafluoroacethyl acetone), (tetrahydorofuran) [D. M. Cox, R. B. Hall, J. A. Horsley, G. M. Kremer, P. Rabinowitz, and A. Kaldor, Science, 205, 390 (1979)].

One object of laser isotope separation and enrichment is to enable high selectivity and to increase decomposition and product yields. Generally, higher decomposition and product yields decrease selectivity. Laser isotope separation and enrichment are generally optimized by optimum selection of starting materials and irradiation conditions. In the laser enrichment of oxygen 18, ethers whose C—O bonds dissociate initially are some of the most suitable raw materials.

Dimethyl ether absorbs infrared energy by the inverse symmetric stretching vibration of C—O—C bond and fluoro-substituted carbonyl compounds absorb infrared energy by the stretching vibration of C—F bond in the oscillation region of a TEA—$CO_2$ laser. The selective laser multiple-photon decomposition of oxygen 18 can be initiated by irradiation with TEA—$CO_2$ laser light on the lower wavenumber side of the absorption.

The enrichment of oxygen 18 by the prior art methods using dimethyl ether as a raw material generally involves the use of relatively expensive raw materials, high decomposition threshold of dimethyl ether, which lowers decomposition and product yields and likelihood of reduced selectivity in the enrichment of oxygen 18 from the carbon monoxide (CO) obtained as the final oxygen-containing product owing to the fact that the CO is obtained through the secondary decomposition of aldehyde.

Additionally, the selective multiple-photon decomposition of oxygen 18 in a single step using a saturated aliphatic ether other than dimethyl ether or a saturated cyclic ether can enrich the concentration of oxygen 18 in the product up to 40%, but markedly reduces the product yield to 1%. On the other hand, when the product yield is increased, the degree of enrichment of oxygen 18 in the product considerably decreases. Therefore, it is difficult to achieve high enrichment and high yield of oxygen 18 at the same time by single step infrared multiple-photon decomposition.

DISCLOSURE OF THE INVENTION

Accordingly, an object of the present invention is to provide an economical method for enrichment of oxygen 18 in a high concentration by laser isotope enrichment of a saturated aliphatic ether and/or a saturated cyclic ether as a starting material.

Another object of the present invention is to provide a method for enrichment of oxygen 18 achieving higher concentration and yield than can be attained by single step infrared multiple-photon decomposition.

The present invention provides the following methods which accomplish the above objects:

(1) a method for enrichment of oxygen 18, which comprises the steps of
 (a) optionally adding a hydrocarbon to a saturated aliphatic ether other than dimethyl ether and/or a saturated cyclic ether as an oxygen 18-containing starting material, and irradiating the material(s) with laser light to induce oxygen 18 selective photodecomposition and
 (b) separating oxygen 18-containing products from the photodecomposed products, and (2) a method for enrichment of oxygen 18, which comprises the steps of
 (a) optionally adding a hydrocarbon to a saturated aliphatic ether other than dimethyl ether and/or a saturated cyclic ether as an oxygen 18-containing starting material, and irradiating the material(s) with laser light to induce oxygen 18 selective photodecomposition, (b) separating oxygen 18-containing products from the photodecomposed products, and (c) converting the obtained oxygen 18-containing products into ethers and applying the ethers as the starting materials to the step (a).

Further, the present invention provides methods for preparation of aldehydes, ethers, alcohols, and carbon monoxide which contain oxygen 18 by the method described in (1) or (2).

Oxygen 18-containing starting materials used in the present invention include saturated aliphatic ethers such as, for example, diisopropyl ether, diethyl ether, and t-butyl methyl ether, and saturated cyclic ethers such as, for example, propyrene oxide, tetrahydoropyran, dioxane, and tetrahydrofuran. Among these, diisopropyl ether and t-butyl methyl ether are preferred and can be readily obtained commercially. The oxygen 18-containing starting materials are preferably reacted under pressure of from 0.1 to 30.0 Torr. Higher reaction pressure than the above range may lower the selectivity of oxygen 18 enrichment. On the other hand, lower reaction pressure than the above range may raise another problem of decreasing the yield of photodecomposed products containing oxygen 18. A more preferred pressure range is from 0.1 to 2.0 Torr.

Hydrocarbons used in the present invention include saturated and/or unsaturated hydrocarbons having from 3 to 6 carbon atoms. Isobutane, propane, and 2-methylbutane are preferred.

The preferred molar ratio of the oxygen 18-containing ether to the hydrocarbon is in the range of from 1:0.1 to 1:30 in the present invention. A higher molar ratio of the hydrocarbons than the above may lower the decomposition and product yields. A lower molar ratio of the hydrocarbons may complicate the product distribution because of the low trapping efficiency of radical species containing oxygen 18. A molar ratio of from 1:1 to 1:3 is more preferred.

The ether or mixture of the ether and hydrocarbon as starting material(s) is charged into an irradiation chamber through a vacuum system by operating valves, in a prescribed amount for a batch-wise method, or is passed into the irradiation chamber at a constant flow rate (10–100 ml/min) for a continuous method. Further, the starting material(s) can be introduced as a molecular beam or be introduced into a vacuum cell as a supersonic beam which is formed by expansion from a nozzle.

The lasers used in the present invention may be selected from those having an ocillation wavelength which selectively photodecomposes oxygen 18-containing ethers. Examples include the TEA—$CO_2$ laser, the hydrogen halide laser, the Raman laser, the CO laser and the $CF_4$ laser.

These lasers can be used individually or in combinations. The TEA—$CO_2$ laser is preferred.

The term "oxygen 18 selective" herein is used to mean that the C—O bond of Oxygen 18-containing ethers is selectively decomposed, and the C—O bond of oxygen 16-containing ethers is not decomposed.

The laser used in the present invention may be employed under continuous oscillation, but preferably employed under pulsed oscillation. In the case of pulsed oscillation, the preferred pulse number is from 10 to 10,000 pulses. A pulse number below this range may lower the efficiency of the oxygen 18 selective photodecomposition, and a higher pulse number may reduce the selectivity of the oxygen 18 enrichment. The more preferred pulse number range is from 10 to 100 pulses.

In addition, the preferred duration of the pulses is from 50 to 1000 ns. A shorter duration sometimes reduces the decomposition and product yields, and a longer duration may reduce the selectivity of oxygen 18 enrichment. The more preferred duration of the pulses is from 80 to 120 ns.

The preferred laser wavelength employed in the present invention is from 950 cm$^{-1}$ to 1160 cm$^{-1}$. The absorption strength of the ethers usually becomes weaker at laser wavelengths above the above range. On the other hand, the decomposition yield may be lowered at shorter laser wavelengths. The more preferred wavelength is from 975 cm$^{-1}$ to 1060 cm$^{-1}$.

The preferred laser fluence employed in the present invention is from 1 to 50 J·cm$^{-2}$. A higher fluence may decrease the selectivity of oxygen 18, and a lower fluence may decrease the yield of photodecomposed products containing oxygen 18. The more preferred range of the laser fluence is from 2 to 10 J·cm$^{-2}$.

The laser irradiation is preferably performed at a temperature of from $-80°$ to $150°$ C. When the temperature is higher than this range, thermal decomposition of the starting material ether may occur. On the other hand, when the temperature is lower than this range, the desired pressure may not be obtained because the vapor pressure of the starting material ether is lowered. The more preferred temperature range is from $-40°$ C. to $50°$ C.

The oxygen 18-containing products formed by the present invention include aldehydes, ketones, alcohols, and/or carbon monoxide.

Other products such as hydrocarbons and hydrogen may be formed as secondary products. Methods for separation of desired products containing oxygen 18 from the mixture of the photodecomposed products include a separation method by a Toepuler pump, a column chromatography method, and a fractional distillation method. Preferred separation methods are the separation method by a Toepuler pump and the column chromatography method.

The efficiency of oxygen 18 enrichment can be increased by converting the products containing oxygen 18 into ethers, inducing the oxygen 18 selective photodecomposition by the laser light using said ethers as a part or all of the starting materials, and separating oxygen 18-containing products from the photodecomposed products.

The oxygen 18-containing products may converted into ethers by known chemical processes. For example, when the products containing oxygen 18 are aldehydes, they can be converted into ethers by dehydration condensation after reduction into alcohols. When the products containing oxygen 18 are alcohols, they can be converted into ethers by dehydration condensation. Reduction of aldehydes into alcohols may be conducted by a catalytic reduction method or a method using reducing agents such as LiAlH$_4$ and the like. The reduction methods by NaBH$_4$ and LiAlH$_4$ are preferred because of their convenience.

The dehydration condensation reaction of alcohols into ethers can be conducted by a method which comprises heating the alcohols in the presence of a catalyst such as sulfuric acid and a method which comprises reacting the alcohols with metallic sodium to form sodium alkoxide and then reacting the sodium alkoxide with alkyl halides to form ethers. From the point of convenience it is preferred that symmetric ethers be synthesized by the heating dehydration using an acidic catalyst, and both symmetric and asymmetric ethers be synthesized by reaction with alkyl halides.

The ethers thus obtained may be used in the second photodecomposition reaction by the laser irradiation after or without purification. In the second photodecomposition by the laser irradiation, fresh ether can be added as a starting material to the ethers thus obtained. Methods for purification of ethers include a column chromatography method and a fractional distillation method. The preferred method is the column chromatography method.

The process for enrichment of the present invention can be operated batch-wise or continuously, using, for example, the apparatus shown in FIG. 1, which will now be briefly explained. The reaction chamber 15 spherical in shape and made of transparent and pressure-resistant PYREX glass. It is equipped with cylinders on both sides and has windows made of NaCl 17. Its internal volume is 2420 cm$^3$. The raw material ether can be introduced into the reaction chamber at a desired pressure amount (batch-wise method) or can be passed at a desired pressure and constant flow rate (continuous method) through a gas handling system 20. The laser light 12 from a TEA—$CO_2$ laser 11 is controlled to a desired diameter by an iris plate 13 and then focused by an optional lens 14 made of $BaF_2$ to irradiate the center of reaction chamber. After irradiation by the TEA—$CO_2$ laser, the sample is separated by the gas handling system 20 and a sample separating system 18, and a part of the sample is analyzed by a gas chromatograph-mass spectrometer 19.

The reactions in one embodiment of the present invention are shown in the following reaction schemes. These schemes are employed for explanation and do not restrict the scope of the present invention.

Scheme 1 shows the reactions where diisopropyl ether is used as the ether starting material and hydrocarbons are not added.

Scheme 2 shows the reactions where isobutane is added to diisopropyl ether and the resulting mixture is irradiated with a laser.

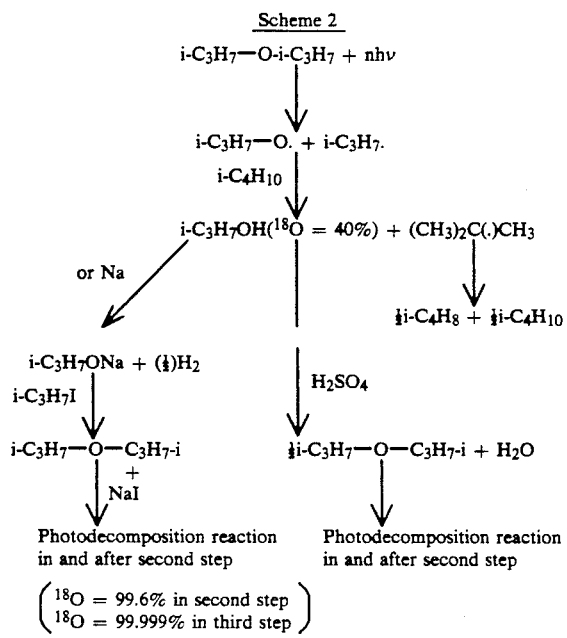

EXPLANATION OF THE SYMBOLS

Figure 1:
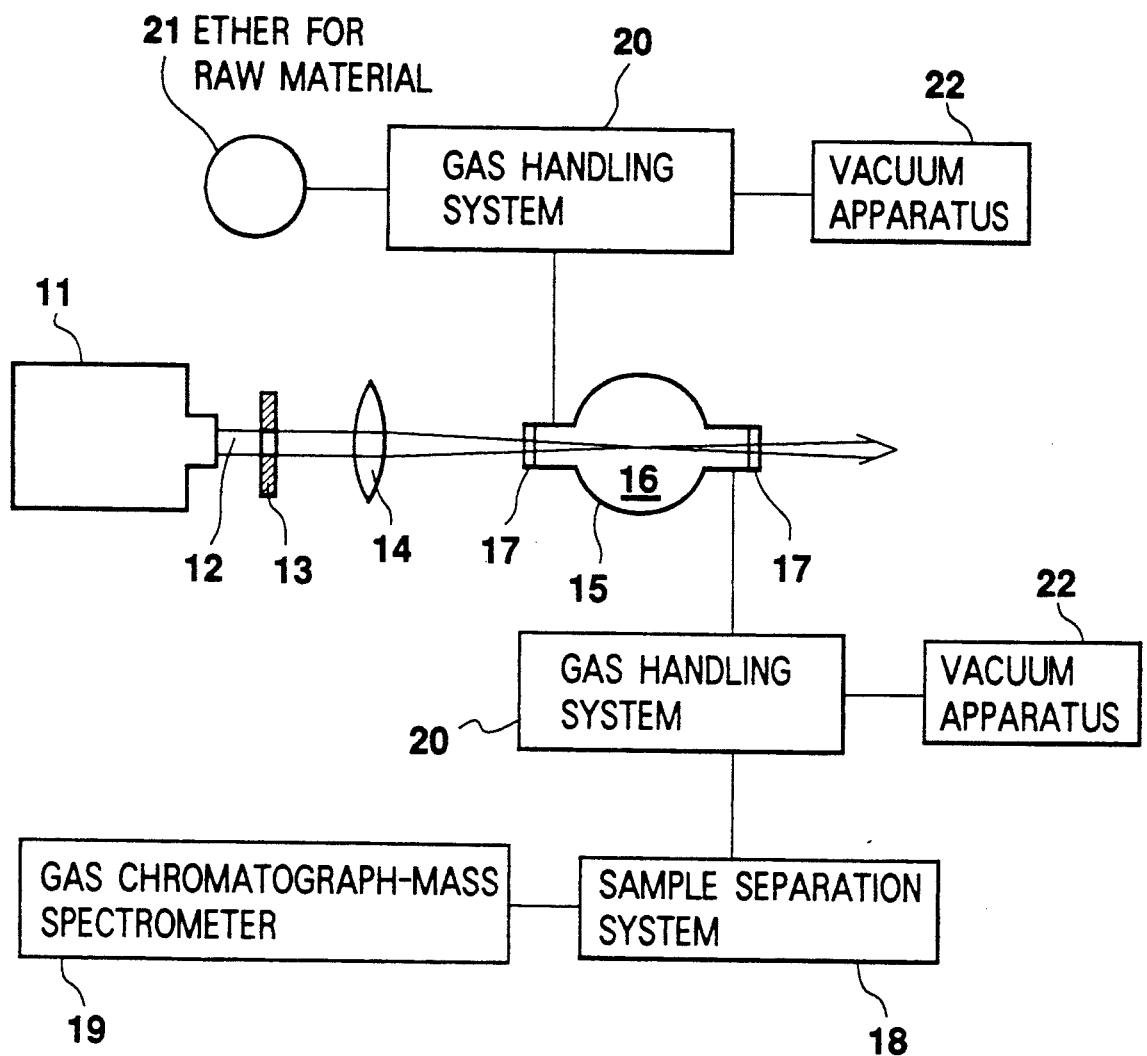
FIG. 1 shows a schematic diagram of an apparatus which can be used to carry out the present invention.

11 TEA—$CO_2$ laser oscillator,
12 laser light,
13 iris plate
14 lens for infrared light,
15 irradiation reaction chamber,
16 gaseous sample,
17 NaCl window plate
18 sample separation system,

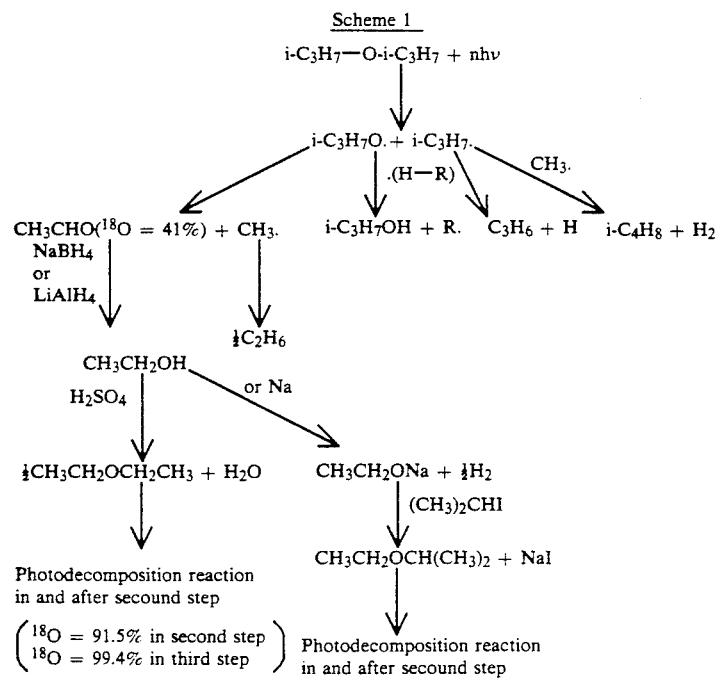

-continued 19 gaschromatograph-mass spectrometer
20 gas handling system,
21 raw material ether, 22 vacuum apparatus.

BEST MODE FOR CARRYING OUT THE INVENTION

The present invention will now be described in detail with reference to examples. Except as otherwise indicated, the following examples were carried out at room temperature.

EXAMPLE 1

Diethyl ether, diisopropyl ether, t-butyl methyl ether, propylene oxide and tetrahydropyran (products of Tokyo Kasei) were used as starting materials after one distillation cycle for purification. Isobutane (product of Takachiho Chemicals) was used as an additive after one vacuum distillation cycle.

FIG. 1 is a schematic diagram of the apparatus used for carrying out the present invention. A beam 12 from a pulse-oscillated TEA—$CO_2$ laser (Type 103-2, manufactured by Lumonics) 11 was passed through the iris plate 13, focused by the lens 14 having a focal length of 20 cm or 170 cm for infrared light and then directed into the irradiation chamber 15, which was located around the focal point, for irradiating saturated ether gas (0.3-20 Torr) 16. The oscillation line of the TEA—$CO_2$ laser was about 10-30 cm$^{-1}$ toward the lower wavenumber side from the absorption band of the ethers. Absorption by oxygen 18-containing ethers can be expected in this wavenumber region. The beam diameters at the focal points were 0.0007 cm$^2$ and 0.33 cm$^2$ for lenses having a focal length of 20 cm and 170 cm, respectively. Accordingly, the laser fluence at the focal point ranged from 1 to 20 J·cm$^{-2}$. A repetition rate of the laser pulses was 0.7 Hz. The irradiation chamber was a sphere shaped glass bulb having a diameter of 17 cm with glass cylinders measuring 9.5 cm in length and 2 cm in inner diameter at its opposite sides. Each glass cylinder had a NaCl window plates 17 at its outer end. The chamber had an irradiation path length of 36 cm and an internal space of 2,420 cm$^3$. The sample after the irradiation with laser light was first separated into trapped components (ethers and the products) and untrapped components (mainly CO) at liquid nitrogen temperature using the separation system 18 such as Toepler pump, and in a instance was further separated into trapped components and untrapped components (mainly aldehyde) at −95° C. Each component was measured by the gaschromatograph-mass spectrometer 19 (gaschromatograph GC-7A, manufactured by Shimazu, mass spectrometer TE-150, manufactured by NEVA) to quantify the decomposition amount of the raw material, the production amount of each product, and the concentration of oxygen 18 in CO and aldehydes.

Table 1 and Table 2 below show the kinds of ethers used as raw materials, the laser irradiation conditions, the oxygen 18 content of the products [oxygen 18/(oxygen 18+oxygen 16)] and selectivity of oxygen 18 enrichment [selectivity=(oxygen 18/oxygen 16 in the products)/(oxygen 18/oxygen 16 in the raw material)].

TABLE 1

Laser irradiation conditions for the infrared multiple-photon decomposition of ethers in oxygen 18 enrichment.

| No. | Starting Material | Pressure Torr | Laser Wavenumber cm$^{-1}$ | Laser Fluence J·cm$^{-2}$ | Pulse Number |
|---|---|---|---|---|---|
| 1 | Diethyl ether | 1.0 | 983.25 | 1.2 | 3000 |
| 2 | Diethyl ether | 1.0 | 982.10 | 1.8 | 3000 |
| 3 | Diisopropyl ether | 3.0 | 978.47 | 15 | 10000 |
| 4 | Diisopropyl ether | 1.0 | 978.47 | 2.8 | 1000 |
| 5 | Diisopropyl ether | 1.0 | 978.47 | 1.2 | 3000 |
| 6 | Diisopropyl ether | 0.3 | 978.47 | 2.7 | 1000 |
| 7 | Diisopropyl ether | 1.0 | 975.93 | 1.9 | 1000 |
| 8 | t-Butyl methyl ether | 3.0 | 1055.63 | 17 | 10000 |
| 9 | t-Butyl methyl ether | 1.0 | 982.25 | 1.9 | 2000 |
| 10 | Propylene oxide | 1.0 | 1057.30 | 1.8 | 2000 |
| 11 | Tetrahydrofuran | 1.0 | 982.10 | 1.7 | 3000 |
| 12 | Tetrahydrofuran | 1.0 | 982.10 | 1.9 | 3000 |
| 13 | Diisopropyl ether + isobutane | 1.0 1.0 | 978.47 | 1.2 | 3000 |

TABLE 2

Enrichment of oxygen 18 by the infrared multiple-photon decomposition of ethers

| No. | Product | Oxygen 18 Content of Product/% | Selectivity of Oxygen 18 Enrichment |
|---|---|---|---|
| 1 | $CH_3CHO$ | 3.0 | 15 |
| 2 | $CH_3CHO$ | 1.8 | 9.2 |
| 3 | CO | 0.28 | 1.4 |
| 4 | $CH_3CHO$ | 1.7 | 8.6 |
| 5 | $CH_3CHO$ | 12 | 70 |
| 6 | $CH_3CHO$ | 14 | 78 |
| 7 | $CH_3CHO$ | 41 | 350 |
| 8 | CO | 0.32 | 1.6 |
| 9 | $CH_3COCH_3$ | 1.3 | 6.6 |
| 10 | $CH_3CHO$ | 0.30 | 1.5 |
| 11 | $CH_3CHO$ | 1.5 | 7.4 |
| 12 | $CH_3CHO$ | 6.2 | 33 |
| 13 | $(CH_3)_2CHOH$ | 3.0 | 15 |

For example, in sample No.7, 1.0 Torr of diisopropyl ether was irradiated by 1000 pulses of TEA—$CO_2$ laser light having a wavenumber of 975.93 cm$^{-1}$ and a fluence at the focal point of 1.9J·cm$^{-2}$. As a result, oxygen 18 was enriched up to 41% in $CH_3CHO$ as an oxygen containing main product as listed in sample No.7 of Table 2, which value is 350 times greater than the natural abundance of oxygen 18.

The results of the above examples show that a relatively high selectivity of oxygen 18 enrichment and improvement of the yield of production were achieved. In particular, sufficiently high selectivity was attained when the pressure of the starting materials and the laser fluence were low.

EXAMPLE 2

The mixture of components separated at −196° C. according to the method of Example 1, No.7, was applied to a column choromatograph to obtain oxygen 18 enriched acetaldehyde at a yield of 10%.

One gram of the acetaldehyde thus obtained was reduced with $LiAlH_4$ to obtain ethyl alcohol at a yield of 90%.

Then the ethyl alcohol was dehydrated by heating in the presence of $H_2SO_4$ to obtain diethyl ether at a yield of 70%. The oxygen 18 content of the obtained diethyl ether was 41% and was the same as that in the acetaldehyde obtained in Example 1, No.7 (41%).

The method of Example 1, No. 1 was repeated using the diethyl ether thus obtained to obtain acetaldehyde which contained 91.5% of oxygen 18 at a yield of 10%. In this case, the selectivity of oxygen 18 enrichment was 15, the same as that of Example 1.

EXAMPLE 3

The acetaldehyde of Example 2 was converted in accordance with the method of Example 2 into diethyl ether to obtain acetaldehyde which contained 99.4% of oxygen 18 at a yield of 10%. The yield of acetaldehyde was 0.1% based on the diisopropyl ether used as the primary raw material. The selectivity of oxygen 18 enrichment was 15, the same as that of Example 1.

EXAMPLE 4

The mixture of components separated at −95° C. according to the method of Example 1, No. 13, was applied to a column choromatograph to obtain oxygen 18 enriched isopropyl alcohol at a yield of 20%.

One gram of the isopropyl alcohol thus obtained was reacted with metallic sodium to form sodium isopropoxide and then reacted with isopropyl iodide to obtain diisopropyl ether at a yield of 75%. The oxygen 18 content of the diisopropyl ether thus obtained was 3% and was the same as that in the isopropyl alcohol obtained in Example 1, No. 13.

The method of Example 1, No. 13 was repeated using the diisopropyl ether thus obtained to obtain isopropyl alcohol which contained 32% of oxygen 18 at a yield of 20%. In this case, the selectivity of oxygen 18 enrichment was 15, the same as that of Example 1.

EXAMPLE 5

The method of Example 4 was repeated using as a raw material the isopropyl alcohol which was obtained in Example 4 and contained 32% of oxygen 18 to obtain diisopropyl ether. The method of Example 1, No. 13 was repeated using the diisopropyl ether thus obtained to obtain isopropyl alcohol which contained 87% of oxygen 18 at a yield of 20%. The yield of isopropyl alcohol was 0.2% based on the diisopropyl ether used as the primary raw material. In this case, the selectivity of oxygen 18 enrichment was 15, the same as that of Example 1.

EXAMPLE 6

The method of Example 5 was repeated using the isopropyl alcohol which was obtained in Example 5 and contained 87% of oxygen 18 to obtain diisopropyl alcohol containing 99% of oxygen 18 at a yield of 20%. The yield of isopropyl alcohol was 0.04% based on the diisopropyl ether used as the primary raw material. In this case, the selectivity of oxygen 18 enrichment was 15, the same as that of Example 1.

As described above, the laser enrichment method of the present invention enables oxygen 18 to be enriched economically and provided in large quantities.

The laser enrichment method of the present invention also makes it possible to reduce the size of the apparatus and the processing time required for the enrichment.

INDUSTRIAL APPLICABILITY

The present invention provides oxygen 18 enriched aldehydes, carbon monoxide, alcohols, ethers, and others, which can be used as tracers and so on.

We claim:

1. A method for enrichment of oxygen 18, which comprises the steps of
    (a) irradiating an oxygen 18-containing saturated aliphatic ether other than dimethyl ether, an oxygen 18-containing saturated cyclic ether, or a mixture thereof with laser light to induce oxygen 18 selective photodecomposition and
    (b) separating oxygen 18-containing products from the photodissociated products.

2. A method for enrichment of oxygen 18, which comprises the steps of
    (a) irradiating an oxygen 18-containing saturated aliphatic ether other than dimethyl ether, an oxygen 18-containing saturated cyclic ether, or a mixture thereof with laser light to induce oxygen 18 selective photodecomposition,
    (b) separating oxygen 18-containing products from the photodecomposed products, and
    (c) converting the obtained oxygen 18-containing products into ethers and applying the ethers as the starting materials to the process (a).

3. The method in accordance with claim 2, wherein the step (c) comprises the steps of
    (f) reducing aldehydes as the products containing oxygen 18 into alcohols, and
    (g) dehydrating the resulting alcohols to form ethers.

4. The method in accordance with claim 2, wherein the step (c) comprises the step of dehydrating the alcohols as the products containing oxygen 18 to form ethers.

5. A method for preparation of oxygen 18-containing aldehydes using a method in accordance with claim 1 or 2.

6. A method for preparation of oxygen 18-containing ethers using a method in accordance with claim 2.

7. A method for preparation of oxygen 18-containing alcohols using a method in accordance with claim 1, 2, or 3.

8. A method for preparation of oxygen 18-containing carbon monoxide using a method in accordance with claim 1 or 2.

9. The method of claims 1 or 2, wherein said saturated aliphatic ether or said saturated cyclic ether or mixture thereof is irradiated in admixture with a hydrocarbon.

10. The method of claim 9, wherein said hydrocarbon is selected from the group consisting of isobutane, propane, and 2-methylbutane.

11. The method of claims 1 or 2, wherein said saturated aliphatic ether is selected from the group consisting of diethyl ether, diisopropyl ether and t-butylmethyl ether, and wherein said saturated cyclic ether is selected from the group consisting of propylene oxide, tetrahydropyran, dioxane, and tetrahydrofuran.

12. The method of claim 9, wherein said saturated aliphatic ether is selected from the group consisting of diethyl ether, diisopropyl ether and t-butylmethyl ether, and wherein said saturated cyclic ether is selected from the group consisting of propylene oxide, tetrahydropyran, dioxane, and tetrahydrofuran.

* * * * *